3,318,720
OXIDATION OF CARBON BLACK
Paul H. Johnson, Richard S. Logan, and Lewis G. Larson, Bartlesville, Okla., assignors to Phillips Petroleum Company, a corporation of Delaware
Filed Oct. 14, 1963, Ser. No. 315,952
7 Claims. (Cl. 106—307)

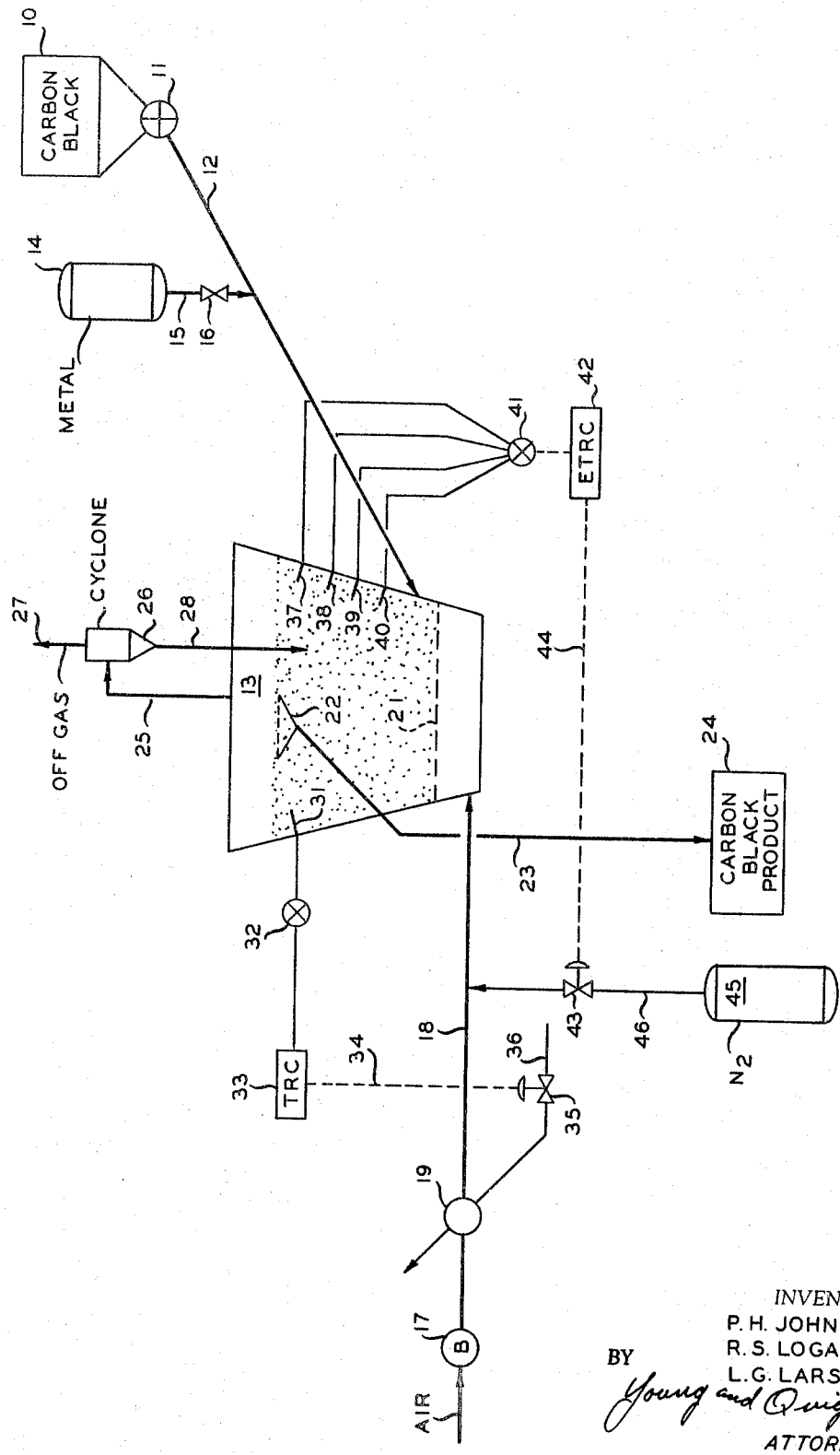

This invention relates to the oxidation of carbon black to modify the surface chemistry properties of the carbon black. In one aspect it relates to the air oxidation of carbon black pellets in a fluidized bed in the presence of catalytic materials. In another aspect the invention relates to means for the oxidation of carbon black pellets in a fluidized bed under carefully controlled conditions of temperature.

Carbon black is produced by various processes, the principal ones being the channel black process and the furnace black process. The furnace black process has, to a large extent, replaced the channel black process because of its greater efficiency and economy. For some purposes, however, channel black imparts more desirable properties in rubber than does furnace black and therefore various proposals have been made to modify the properties of furnace carbon black so as to approximate more nearly the properties of channel black. One method for modifying the properties of furnace carbon black is to treat the carbon black at elevated temperature with an oxygen-containing compound, for example, air, so as to oxidize, at least partially, the surface of the carbon black particle or a material adsorbed on the surface of the carbon black particle.

The treatment of carbon black with an oxygen-containing material, e.g., the air or ozone oxidation of carbon black, has been more or less restricted to the treatment of loose black because attempts to treat pelleted furnace carbon blacks has resulted in overtreatment of the particles on the surface of the pellet and undertreatment of the particles on the interior of the pellet. It has been found, however, that carbon black pellets can be treated satisfactorily by conducting the oxidation reaction with carbon black pellets as a fluidized bed within the reactor and with the oxidizing air stream as the fluidizing medium.

We have discovered that the time required to reduce the pH value of a furnace carbon black to a desirable low level can be accomplished in the fraction of the time normally required in treating a fluidized bed of carbon black pellets with an oxidizing agent such as air if the reaction is conducted in the presence of a catalytic amount of an inorganic compound of a polyvalent metal. The metal compound can be introduced into the reaction by wetting the carbon black pellets with an aqueous solution of the metal compound prior to treating the carbon black pellets in the fluidized bed with the oxygen-containing gas.

It is therefore an object of this invention to provide a process and apparatus for oxidizing furnace carbon black pellets catalytically to produce a modified furnace carbon black. It is also an object of this invention to provide a process and apparatus for conducting the oxidation reaction under controlled conditions of temperature. A further object of the invention is to provide an improved method and means for modifying the surface chemistry of furnace carbon black. Other objects and advantages of the invention will be apparent to those skilled in the art upon study of the disclosure of the invention including the detailed description of the invention and the appended drawing wherein:

The sole figure of the drawing illustrates an arrangement of apparatus for carrying out the process of the invention.

We have found that inorganic compounds of polyvalent metals are capable of catalyzing the air oxidation of furnace carbon black pellets in a fluidized bed when the carbon black pellets are impregnated with the metal compound in the form of an aqueous solution employed to wet the pellets prior to the oxidation reaction. Metals which are particularly beneficial in this catalytic reaction include copper, silver, gold, boron, aluminum, tin, lead, vanadium, chromium, molybdenum, manganese, iron, cobalt and nickel. Compounds of vanadium, chromium and manganese are particularly active as oxidation catalysts in the process of our invention. Inorganic compounds of these metals include water soluble oxides, hydroxides, carbonates, nitrates, vanadates, chromates, manganates and halides. Specific compounds which have been found beneficial in the process of our invention include chromium nitrate, chromium chloride, copper chloride, vanadium pentoxide, potassium dichromate, and potassium permanganate. We have found that about 200 to 500 parts per million by weight, with respect to the carbon black, of metal added as a water-soluble metal compound will reduce the pH of the carbon black in one hour or less to a value which requires about 10 hours of normal fluidized bed air oxidation. The catalyst concentration can be from about 25 to 1000 p.p.m. of the carbon black or more, based on the metal of the metal compound. Mixtures of metal compounds can be used.

The catalytic air oxidation of furnace carbon black pellets can be accomplished at a temperature in the range of about 550 to 950° F. and the reaction time can vary from about 30 to 600 minutes. The reaction is exothermic and will tend to runaway or become self-generating at temperatures above about 850° F. unless the oxygen content of the fluidizing gas is reduced rapidly. A convenient method for reducing the oxygen content of the fluidizing gas is to dilute the fluidizing gas with an inert gas, preferably one that is not heated. Flue gases can be employed as the diluent gas; however, a diluent which is free from carbon monoxide or carbon dioxide is preferred. A substantially completely inert gas such as nitrogen, helium and the like is preferred for the diluent gas so as to avoid surface chemistry effects which might be caused by the diluent gas.

The following specific examples will be helpful in attaining an understanding of the invention; however, it should be understood that such specific embodiments of the invention are for purpose of illustration and should not be construed as unduly limiting the invention.

The runs reported herein were conducted in a stainless steel tapered reactor (smaller at the bottom than at the top) with external electric heaters surrounding the reactor. Thermocouples were placed at various points in the reactor so as to sense the temperature of the fluidized bed at various levels. Air was used as the fluidizing medium and was heated in an external heater prior to entry into the bottom of the reactor. Nitrogen from a cylinder was employed to vary the oxygen content of the fluidizing air stream and as a quench to arrest runaway reactions. The following Table I shows the properties of the carbon black samples treated.

TABLE I.—CARBON BLACK STOCKS

| Sample | A | B |
|---|---|---|
| Nature of Black | (1) | (1) |
| pH | 7.9 | 8.9 |
| Volatile Matter, Weight Percent | 2.65 | 3.07 |

1 HAF Pellets.

The results of a number of runs comparing the results of air oxidation of the carbon black pellets with metal-promoted air oxidation of carbon black pellets are shown in Table II. In these runs nitrogen was used to dilute the fluidizing air stream in runs where runaway reactions occurred or threatened to occur, for example, runs 4, 11 and 13.

removed from the off-gas stream is returned to the fluidized bed via conduit 28.

Thermocouple 31, positioned in the fluidized bed in reactor 13, senses the temperature of the carbon black in the reactor and this temperature signal is transmitted via temperature transmitter 32 to temperature recording controller 33 which is connected by linkage 34 to motor

TABLE II.—EFFECTS OF METALS ON AIR OXIDATION OF CARBON BLACK

| | Run Number | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Carbon Black Sample | A | B | A | A | A | A | A | A | A | A | A | B | A | B |
| Carbon Black, Grams | 600 | 600 | 600 | 750 | 600 | 600 | 600 | 600 | 600 | 600 | 750 | 600 | 750 | 600 |
| Additive Metal Salt | 0 | 0 | (1) | (1) | (2) | (2) | (2) | (2) | (2) | (3) | (4) | (4) | (5) | (5) |
| Additive, p.p.m. Metal | 0 | 0 | 390 | 520 | 510 | 200 | 50 | 200 | 200 | 50 | 520 | 400 | 588 | 440 |
| Air Flow, Cu. ft./hr | 40 | 40 | 40 | 40 | 40 | 40 | 40 | 40 | 40 | 40 | 40 | 40 | 40 | 40 |
| Temperature at start, °F | 600 | 600 | 600 | 600 | 600 | 600 | 612 | 575 | 503 | 605 | 600 | 605 | 600 | 603 |
| Maximum Temperature, °F | 619 | 620 | 670 | 1,040 | 717 | 685 | 932 | 580 | 512 | 612 | 680 | 819 | 1,200 | 637 |
| pH at— | | | | | | | | | | | | | | |
| 1 Hour | 7.4 | 6.8 | 5.0 | | 5.3 | 4.3 | 5.4 | 6.5 | 7.4 | 6.9 | | 5.4 | | 7.2 |
| 2 Hours | 6.9 | 6.2 | 4.3 | | 3.2 | 4.1 | 5.0 | 6.7 | 7.1 | 6.5 | | 4.9 | | 6.4 |
| 4 Hours | 6.0 | 5.7 | 3.5 | 4.9 | 2.7 | 3.7 | 4.5 | 6.3 | 7.1 | 6.2 | 3.4 | 4.3 | 6 3.2 | 5.3 |
| 10 Hours | 4.2 | 4.8 | 3.4 | | 2.7 | 3.3 | 3.8 | 5.4 | 6.2 | 4.6 | | 4.1 | | 4.5 |
| Volatile Matter at— | | | | | | | | | | | | | | |
| 1 Hour | 2.40 | 5.94 | 3.31 | | 3.52 | 3.15 | 4.17 | 2.49 | 2.35 | 2.59 | | 3.47 | | 2.25 |
| 2 Hours | 2.99 | 5.56 | 4.43 | 3.19 | 5.55 | 3.71 | 4.87 | 2.87 | 2.46 | 3.37 | | 3.48 | | 2.88 |
| 4 Hours | 3.64 | 6.61 | 4.86 | | 5.86 | 3.97 | 4.43 | 3.18 | 2.76 | 3.69 | 5.06 | 4.68 | 6 6.65 | 4.84 |
| 10 Hours | 4.14 | 8.33 | 4.95 | | 6.66 | 4.14 | 4.95 | 3.64 | 2.94 | 3.81 | | 6.36 | | 5.79 |

1 $Cr(NO_3)_3$.
2 $V_2O_5$.
3 $CuCl_2$.
4 $K_2Cr_2O_7$.
5 $KMnO_4$.
6 7 Hours.

It should be noted that carbon black Sample A had an initial pH value of 7.9 and at the end of one hour of normal air oxidation the pH was reduced only to 7.4 whereas the pH was reduced to 5.0 in run 3; 5.3 in run 5; 4.3 in run 6; and 5.4 in runs 7 and 12 after one hour of treatment.

The increased reaction rate of the catalyzed reaction indicates that the temperautre spread between no reaction and self-supporting reaction or combustion is much smaller than in the noncatalyzed fluidized bed, air oxidation of carbon black pellets. This increased reaction rate requires a more precise control of the reaction temperature than in the noncatalyzed reaction but also provides a more uniform product because each carbon black particle will be more receptive to treatment whereas the particles of black in the noncatalyzed reaction are receptive to treatment in varying degrees. The result is that the product of the noncatalyzed process will represent an average of particles treated to a lower level of oxidation and the product of the catalyzed reaction will represent an average of particles treated to a higher level of oxidation, assuming the same time and temperature conditions. Stated another way, the proportion of the total of the particles of the catalyzed reaction which is oxidized to a given pH level is greater than that in the noncatalyzed reaction so that the deviation of the pH value of the individual particles from the mean in the catalyzed reaction is smaller than in the noncatalyzed reaction.

The figure of the drawing ilustrates a system for the catalyzed fluidized bed, air oxidation of carbon black pellets with means for precise control of the temperature in the fluidized bed.

In the drawing carbon black in supply vessel 10 is introduced via star valve 11 and conduit 12 into the bottom of reactor 13. A measured amount of metal compound solution is introduced from storage vessel 14 via conduit 15 and valve 16 into conduit 12. Air is passed from blower 17 via conduit 18 and heater 19 into the bottom of reactor 13 so as to pass upwardly through distribution plate 21 and maintain the carbon black in the reactor 13 in a fluidized conditon. Carbon black passes from the top of the fluidized bed in reactor 13 via collector 22 and conduit 23 to carbon black product storage vessel 24. Off-gas passes from the top of reactor 13 via conduit 25 and cyclone 26 to off-gas stack 27. Carbon black valve 35 in the conduit 36 supplying heating medium to heater 19. The temperature recording controller is set at a desired operating temperature, for example, 600° F., and the temperature recording controller then controls the quantity of heat added to the air so as to maintain the temperature in the fluidized bed at this preset temperature level.

The reaction is exothermic and is quite rapid in the presence of the metal catalyst with the result that it is desirable to provide a means for quenching the reaction in case a temperature runaway is initiated. Thermocouples 37, 38, 39 and 40 are positioned at various points within the fluidized bed so that any abnormal temperature rise in the fluidized bed will be sensed quickly by one of these thermocouples and passed via temperature transmitter 41 to emergency temperature recording controller 42. When emergency temperature recording contoller 42 senses a temperature which is above the set point temperature, e.g., 700° F., the controller 42 opens valve 43 by means of linkage 44 to introduce an inert gas such as nitrogen into conduit 18 from cylinder 45 via conduit 46.

If desired, off-gas from stack 27 can be recycled to blower 17 to conserve heat and relieve the load on heater 19. In this case emergency temperature recording controller 42 can be connected to a valve in a 3-way valve in the recycle conduit to divert the flow of off-gas to the stack 27 if a runaway reaction, i.e., incipient combustion, is initiated.

That which is claimed is:

1. In the air oxidation of furnace carbon black pellets in a fluidized bed at a temperature in the range of about 550 to 950° F. so as to reduce the pH value of the carbon black, the improvement comprising impregnating the carbon black with about 25 to 1000 p.p.m. by weight of a compound selected from the group consisting of the water soluble oxides, hydroxides, carbonates, nitrates, vanadates, chromates, manganates, and halides of boron, copper, gold, silver, aluminum, tin, lead, vanadium, chromium, molybdenum, manganese, iron, cobalt and nickel prior to said air oxidation.

2. A process for oxidizing carbon black which comprises passing a fluidizing amount of a heated oxygen-containing gas upwardly through a body of carbon black pellets impregnated with a catalytic amount of a compound selected from the group consisting of the water soluble oxides, hydroxides, carbonates, nitrates, vanadates, chromates, manganates, and halides of boron, copper, gold, silver, aluminum, tin, lead, vanadium, chromium, molybdenum, manganese, iron, cobalt and nickel at a temperature in the range of about 550 to 950° F. for a period of time in the range of about 30 to 600 minutes.

3. A process for reducing the pH value of a furnace carbon black which comprises wetting a body of carbon black pellets with sufficient aqueous solution of a compound selected from the group consisting of the water soluble oxides, hydroxides, carbonates, nitrates, vanadates, chromates, manganates, and halides of boron, copper, gold, silver, aluminum, tin, lead, vanadium, chromium, molybdenum, manganese, iron, cobalt and nickel to impregnate the carbon black with about 25 to 1000 p.p.m. by weight of metal; passing an oxygen-containing gas upwardly through said body of carbon black so as to fluidize said body of black at a temperature in the range of about 550 to 900° F. for a time sufficient to reduce the pH value of the carbon black.

4. The process of claim 3 wherein the compound is a chromium compound.

5. The process of claim 3 wherein the compound is a vanadium compound.

6. The process of claim 3 wherein the compound is a manganese compound.

7. The process of claim 3 wherein the compound is a copper compound.

References Cited by the Examiner
UNITED STATES PATENTS

| | | | |
|---|---|---|---|
| 2,641,533 | 6/1953 | Cines et al. | 23—209.1 |
| 2,682,448 | 6/1954 | Cines | 23—209.1 |
| 3,023,118 | 2/1962 | Donnet | 106—307 |
| 3,094,428 | 6/1963 | Hamilton | 106—307 |
| 3,206,285 | 9/1965 | Johnson | 106—307 |
| 3,213,026 | 10/1965 | Jordan et al. | 106—307 |

TOBIAS E. LEVOW, *Primary Examiner.*

HELEN M. McCARTHY, *Examiner.*

S. E. MOTT, *Assistant Examiner.*